United States Patent [19]
Hutcheson

[11] 3,980,839
[45] Sept. 14, 1976

[54] MAINTENANCE MONITOR FOR TELEPHONE SWITCHING SYSTEMS

[75] Inventor: Alan G. Hutcheson, Reno, Nev.

[73] Assignee: Lynch Communication Systems, Inc., Reno, Nev.

[22] Filed: Dec. 9, 1974

[21] Appl. No.: 530,960

[52] U.S. Cl. ........................................ 179/175.2 R
[51] Int. Cl.² ................................................ H04M 3/24
[58] Field of Search ............ 179/175.2 R, 175.2 C; 445/1

[56] References Cited
UNITED STATES PATENTS

| | | |
|---|---|---|
| 3,287,703 | 11/1966 | Slotnick .................................. 445/1 |
| 3,492,445 | 1/1970 | Lecoanet .................... 179/175.2 R |
| 3,573,746 | 4/1971 | Robinson ................................ 445/1 |
| 3,626,383 | 12/1971 | Oswald .......................... 179/175.2 R |
| 3,833,773 | 9/1974 | Johnson ........................ 179/175.2 R |
| 3,898,395 | 8/1975 | Crosley et al. ................ 179/175.2 R |

Primary Examiner—Douglas W. Olms
Attorney, Agent, or Firm—Phillips, Moore, Weissenberger, Lempio & Strabala

[57] ABSTRACT

A data processing system for monitoring a telephone switching system comprises a microprocessor controller, random access and read only memories, and data input and error output means. The data processing system analyzes the received data to determine if the switching system is operating correctly, and if it is not outputs coded information indicating the errors discovered and methods for switching system repair.

26 Claims, 14 Drawing Figures

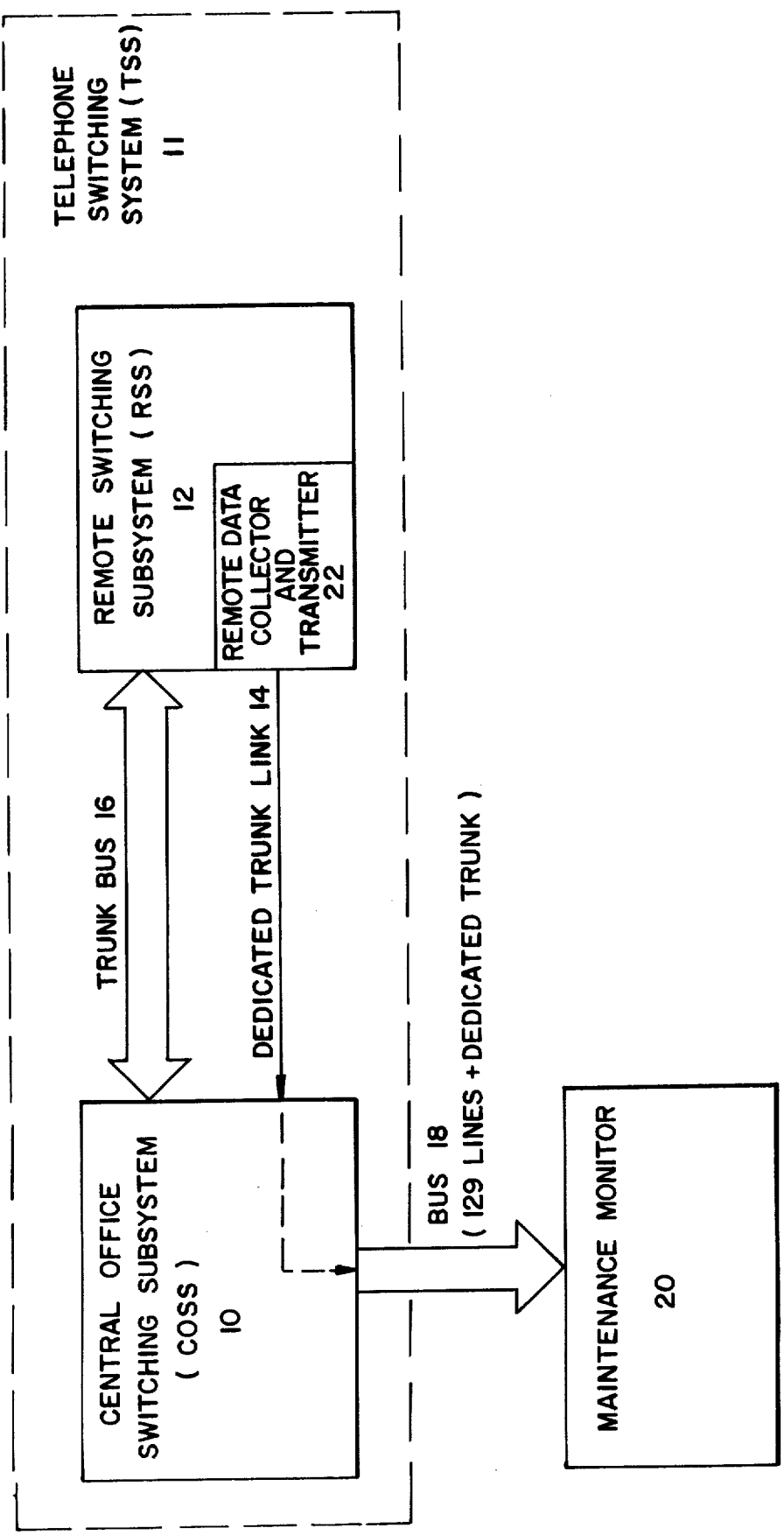
FIG_1

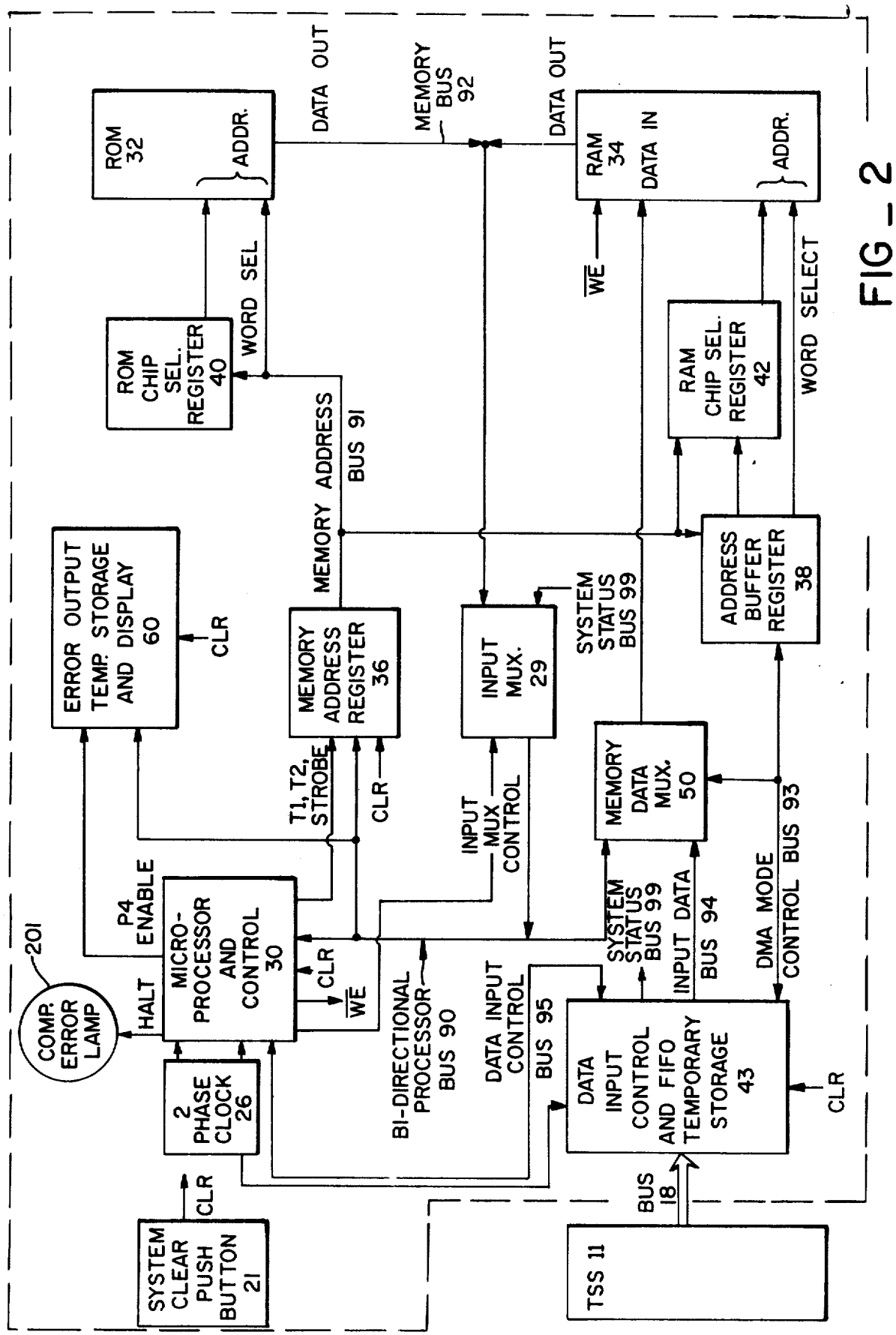
FIG_2

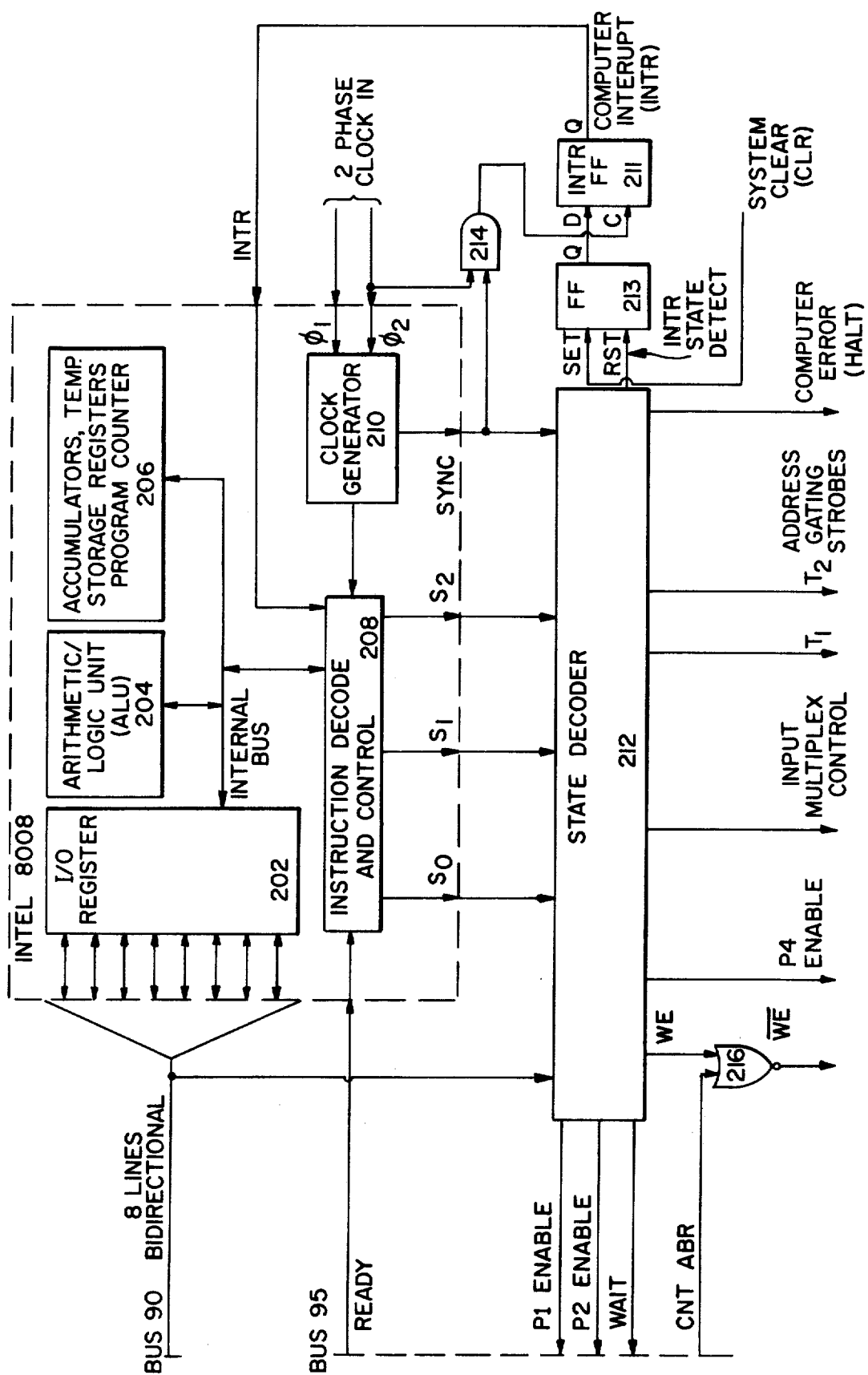
FIG_3

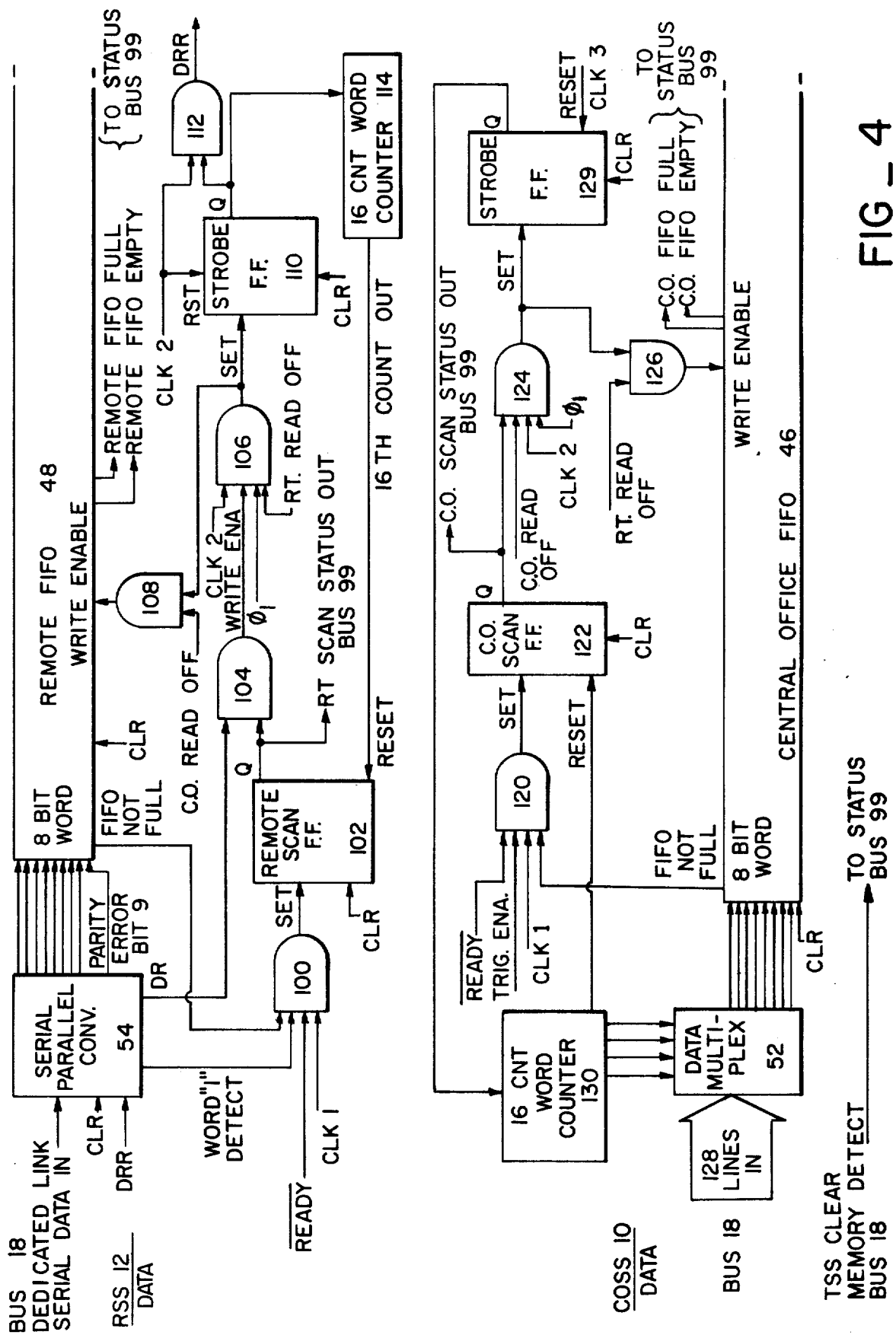
FIG_4

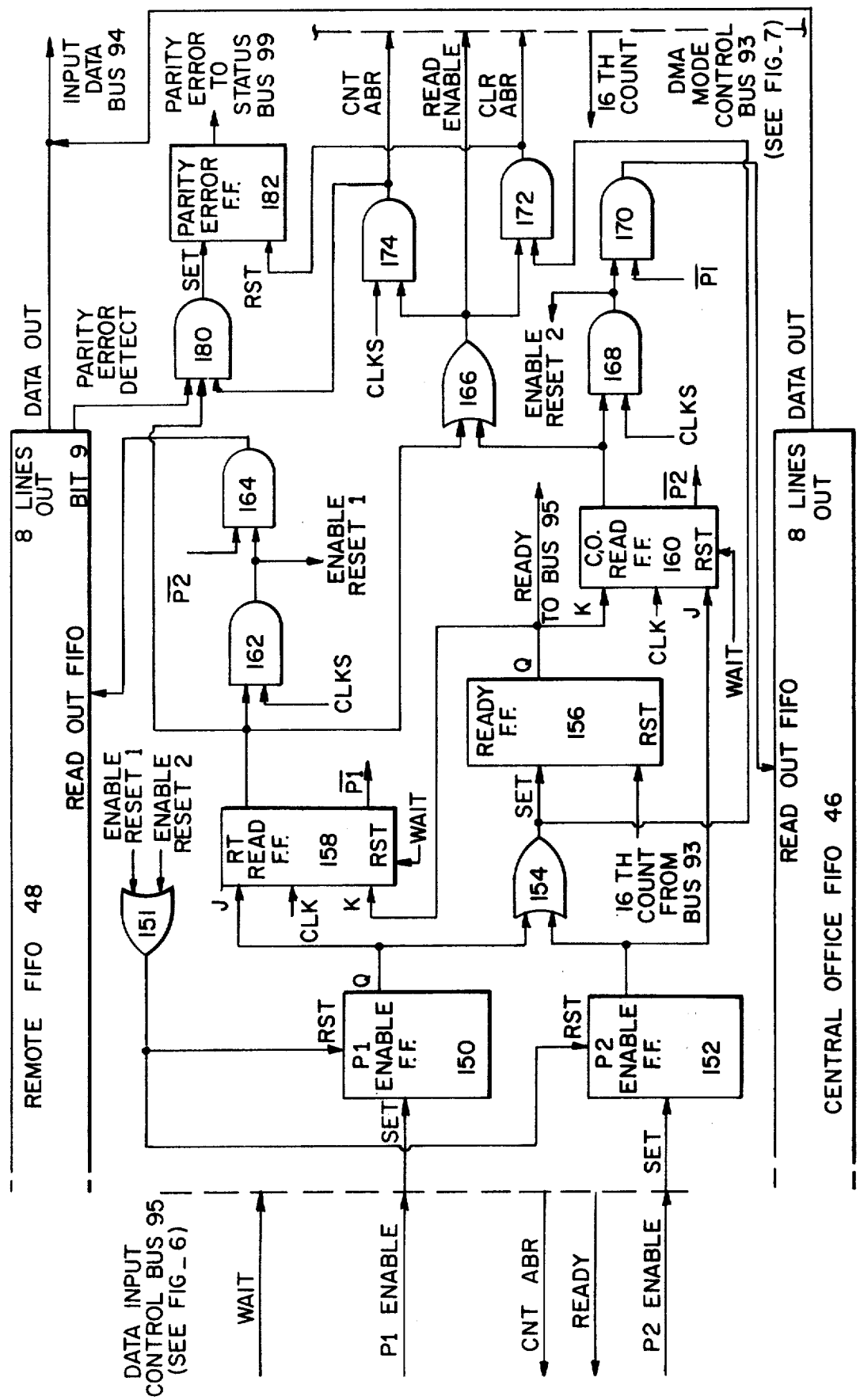
FIG_5

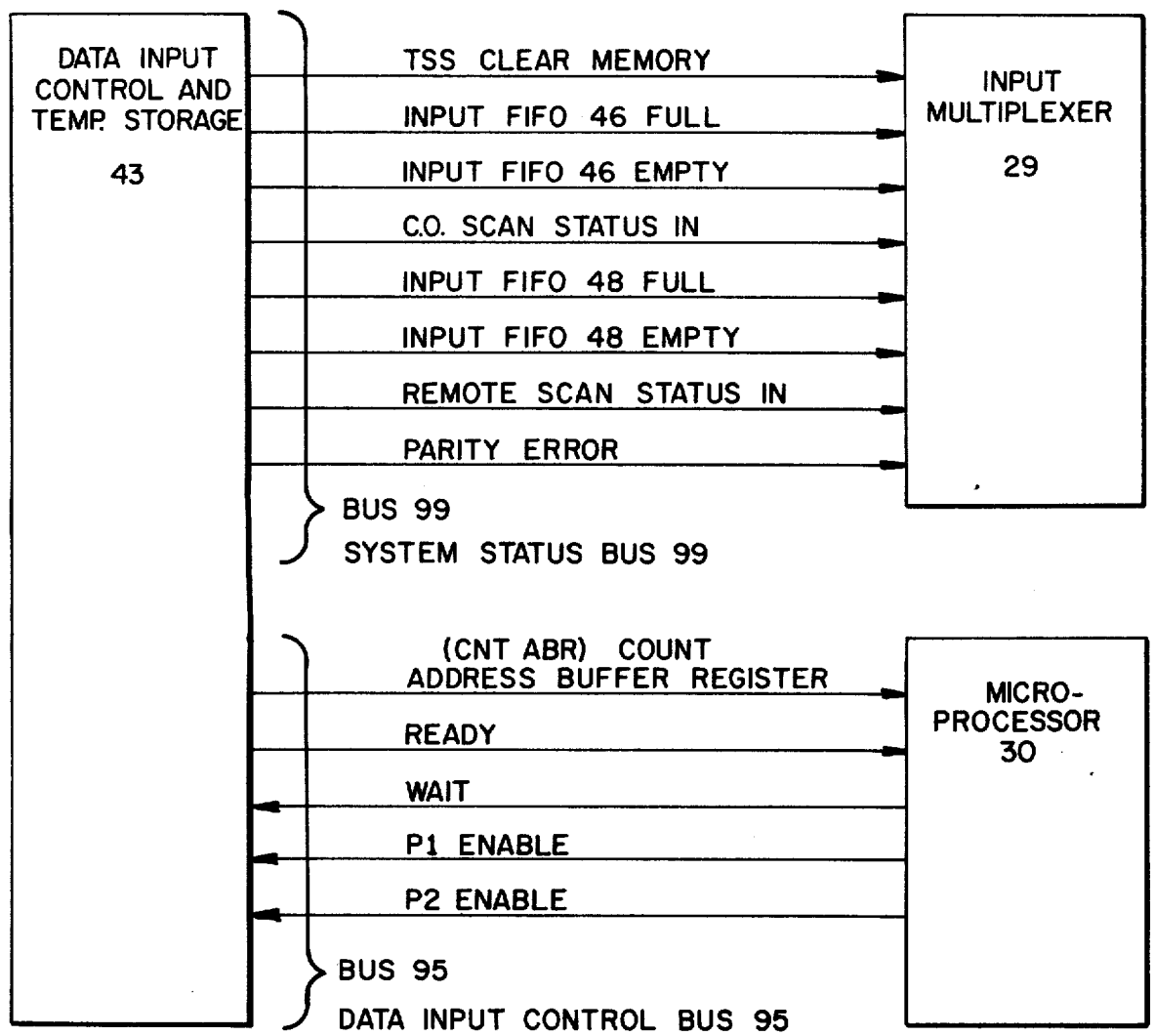
FIG_6
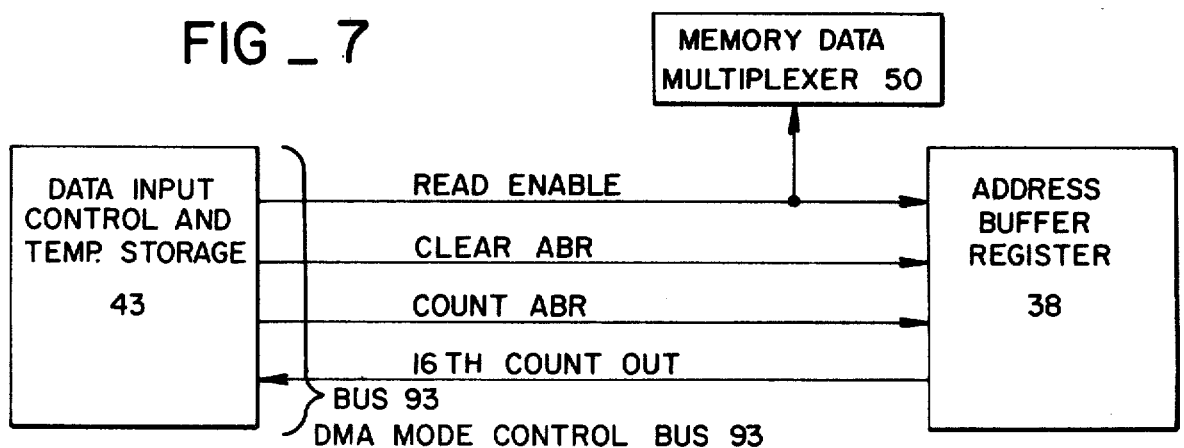
FIG_7

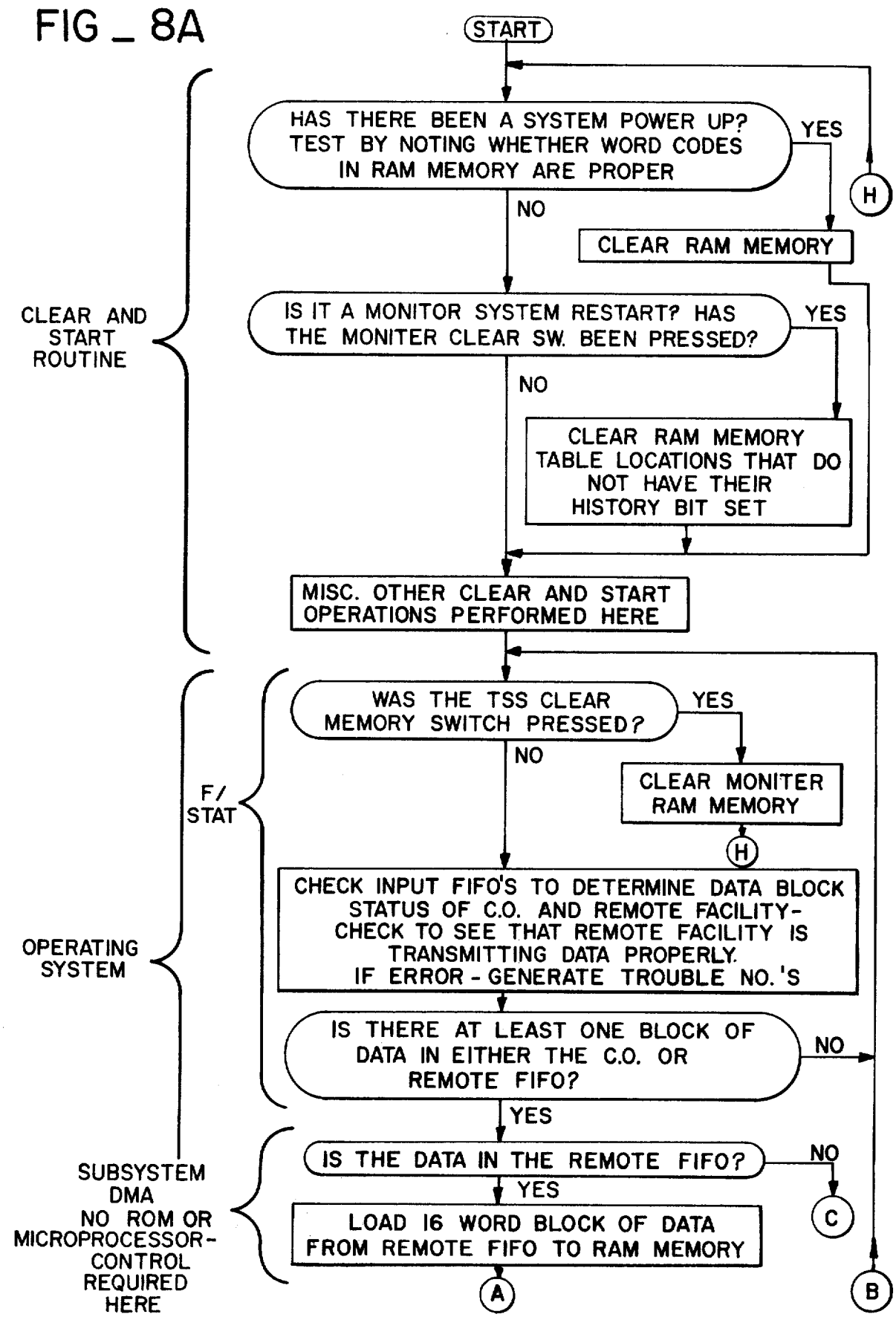

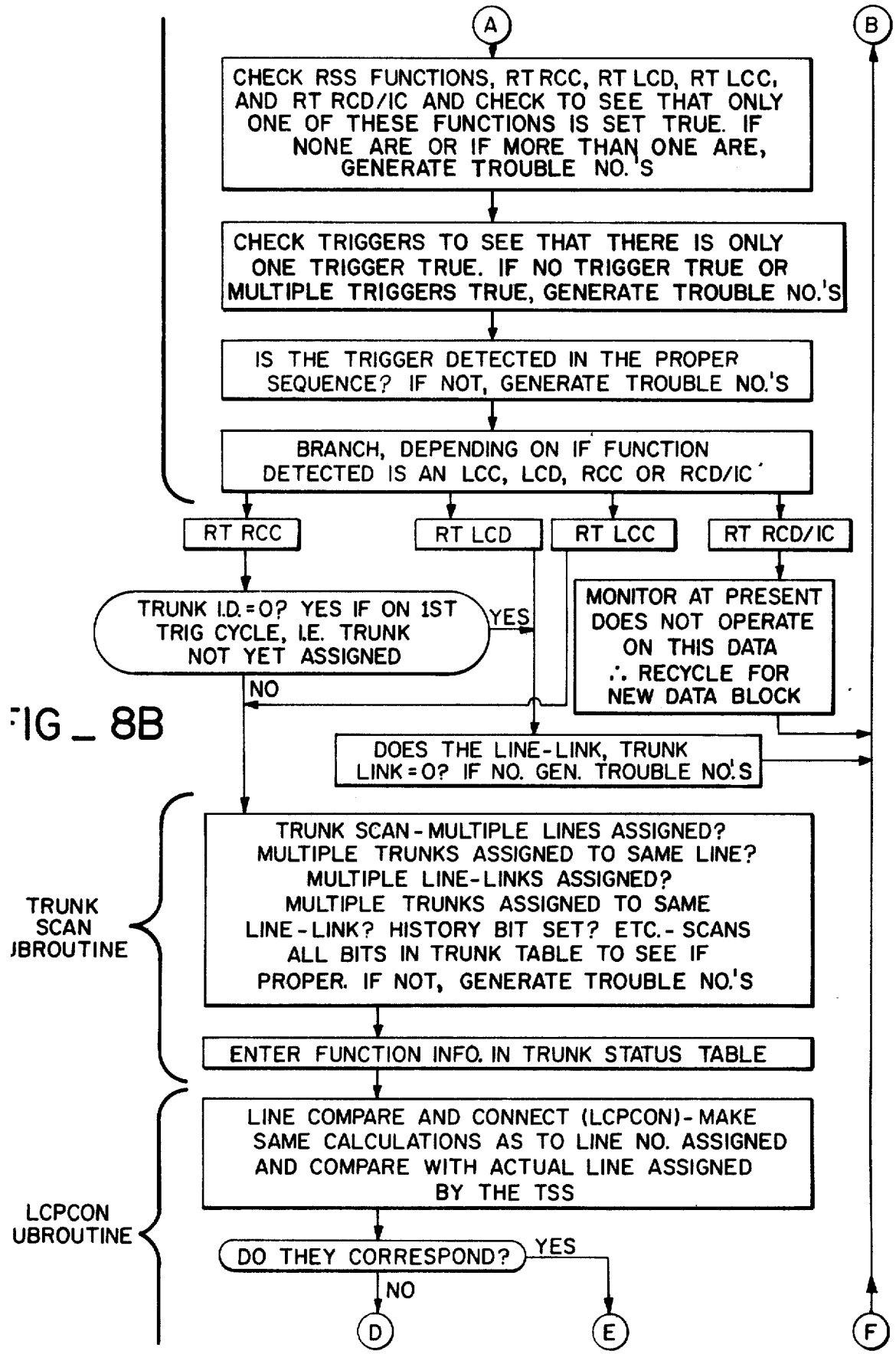
FIG_8B

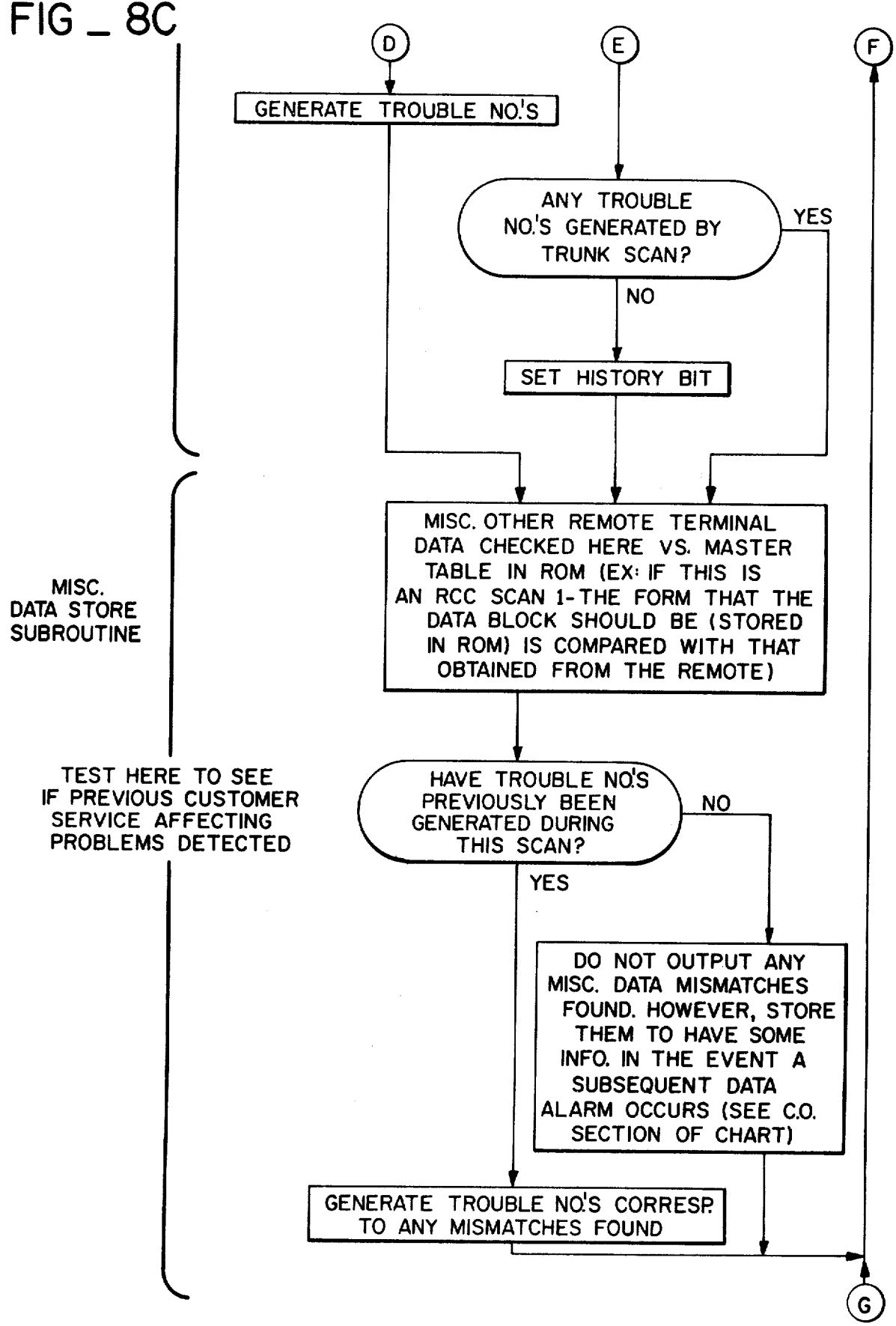
FIG _ 8C

FIG_8D
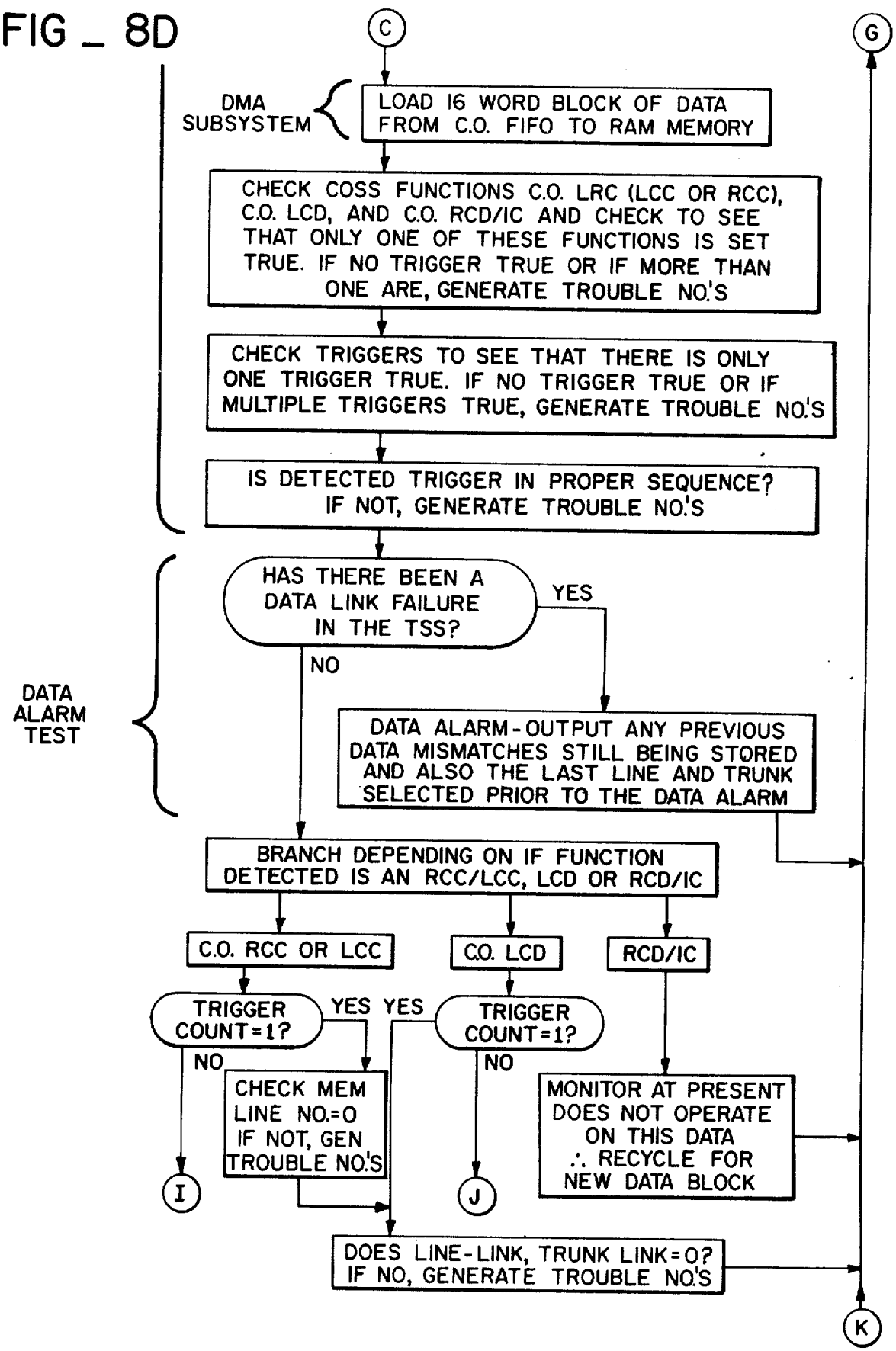

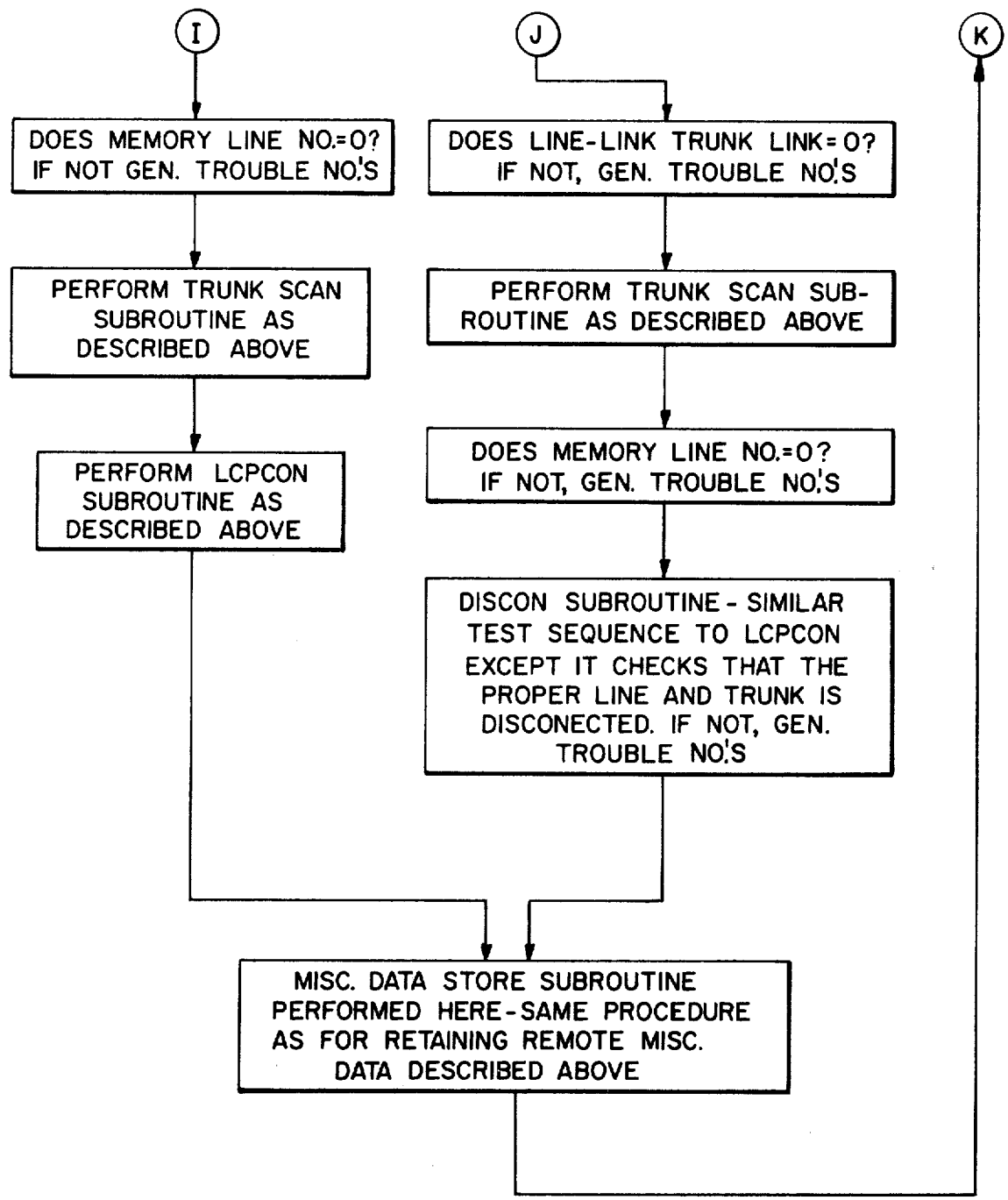
FIG _ 8E

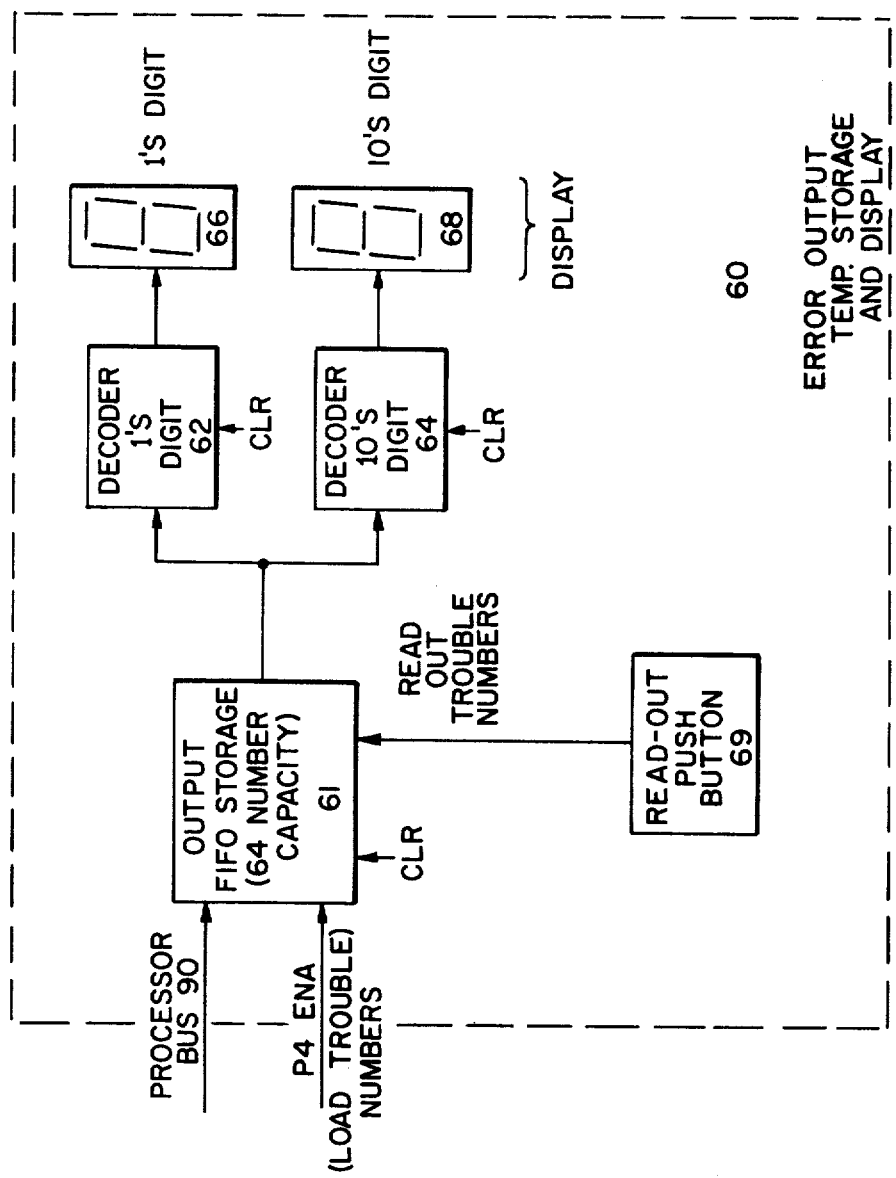
FIG_10
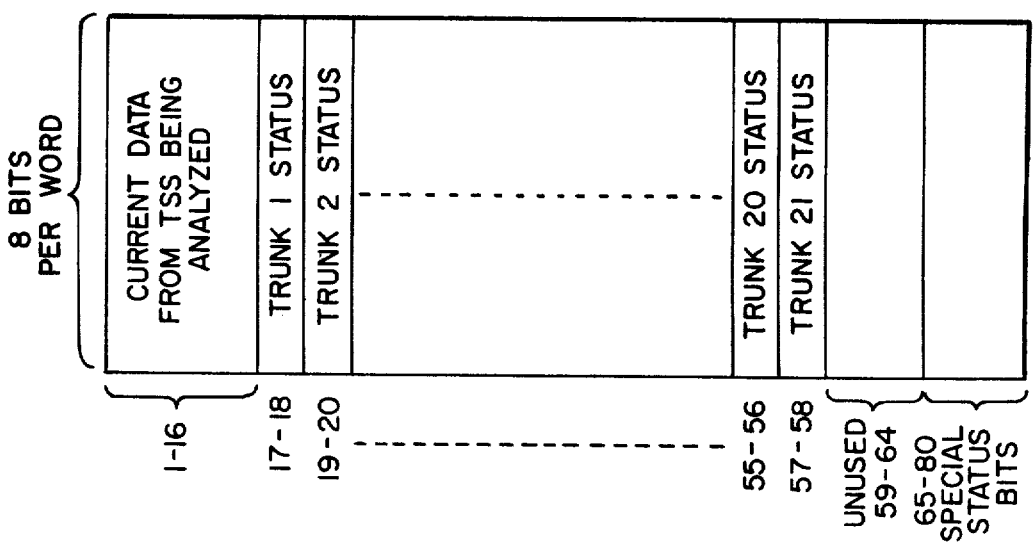
FIG_9

MAINTENANCE MONITOR FOR TELEPHONE SWITCHING SYSTEMS

BACKGROUND OF THE INVENTION

1. Field of the Invention

The present invention relates generally to digital data processing systems and, more particularly, to a processing system that is designed to detect and diagnose errors in operation of a telephone switching system.

2. Description of the Prior Art

In the past, most monitoring systems for telephone switching systems have either been merely traffic monitors that record which trunks of a switching system are in operation at a given time and requiring interaction for system error analysis, or strictly maintenance devices that are attached to a system by a technician only after a system failure to diagnose the failure. Those maintenance monitors providing continuous monitoring of switching for the automatic detection and diagnosis of errors have been very complex, bulky and expensive devices that usually are only used on the most complex of switching systems. The present invention takes advantage of current electronic microcircuit technology to create a unique, reliable and compact monitoring system that is designed to automatically detect, diagnose, store and display switching system errors and designed to minimize the effort required to add-on such a device to switching systems already installed and operating in the field.

SUMMARY OF THE INVENTION

The present maintenance monitor invention is a data processing system comprising a microprocessor controlled by a control program stored in a non-destructive, read-only memory (ROM). It also contains a random-access memory (RAM) which includes storage for the status of the various switching trunks being monitored and storage for the current block of data being analyzed. The data input circuitry includes state-of-the-art data multiplexers, serial to parallel data converters and temporary word storage devices, including first-in, first-out (FIFO) word storage and shifting devices. Finally, the circuitry that outputs any detected telephone switching system (TSS) errors comprises a simple means of formatting the types of errors diagnosed and means for the communication of this information to TSS maintenance personnel.

Accordingly, it is a principal object of this invention to provide a system, including a microprocessor controlled by a system controller, for continuously monitoring and analyzing the data received from a telephone switching system (TSS) for the detection, diagnosis, storage and display of TSS operation errors.

Another object of this invention is to provide a data monitoring system that is installable with minimum effort in telephone switching systems already in operation.

Still another object of this invention is to provide a system that takes advantage of the flexibility, reliability, and compactness of state-of-the-art microcircuits.

Yet another object of this invention is to provide a system that takes advantage of the simplifications inherent in systems using state-of-the-art microcircuits.

Yet still another object of this invention is to provide a system that makes possible the use of relatively untrained maintenance personnel for the servicing of a telephone switching system.

Still yet another object of this invention is to provide a system that is designed to minimize system memory requirements.

Another object of this invention is to provide a system that allows errors to be read out of the maintenance monitor independent of, and asynchronous with, continuous monitor analysis of telephone switching system data.

BRIEF DESCRIPTION OF THE DRAWINGS

These and other objects and advantages of the present invention will become more apparent upon reference to the following description and the accompanying drawings in which:

FIG. 1 illustrates in general block diagram form a data processing system according to the present invention;

FIG. 2 is a block diagram of the maintenance monitor unit shown in FIG. 1;

FIG. 3 illustrates an embodiment of the microprocessor control unit shown in FIG. 2;

FIG. 4 is a schematic of the data writing aspect of the data input control unit shown in FIG. 2;

FIG. 5 is a schematic of the data reading into memory (DMA) aspect of the data input control unit shown in FIG. 2;

FIG. 6 illustrates the type of signals which are transferred over the data input control bus and system status bus shown in FIG. 2;

FIG. 7 illustrates the type of signals which are transferred over the DMA mode bus shown in FIG. 2;

FIG. 8 is a flow diagram of the control cycle executed by the microprocessor unit of FIG. 2;

FIG. 9 depicts a table of typical RAM memory allocations; and

FIG. 10 is a schematic of the error output unit shown in FIG. 2.

DESCRIPTION OF AN ILLUSTRATIVE EMBODIMENT

General

The maintenance monitor is illustrated in block diagram form in FIG. 2. The maintenance monitor 20 receives status data from the telephone switching system (TSS) 11 and temporarily stores this data in first-in/first-out (FIFO) temporary storage registers 46, 48 (shown in detail in FIGS. 4 and 5) under the control of the data input control unit 43. The maintenance monitor 20 also consists of a microprocessor 30 controlled by a control cycle program stored in a non-destructive read-only memory (ROM) 32. The microprocessor 30, when it is ready to operate on new data, tells the data input control unit 43 to transfer one of the temporarily stored blocks of data in one of the input FIFO's 46 or 48 to the random access memory (RAM) 34 for analysis. After the data input control unit 43 has automatically loaded a 16 word block of data into the RAM 34, the data analysis begins. During analysis, the microprocessor 30 compares the data in part with data reference tables also stored in the ROM 32, and in part with what the control program computes that the data should be, based on the current status of the TSS 11 which is also stored in the RAM 34. Upon completion of the analysis of the current block of data, the status of the TSS 11 is updated based on this information and a new data block analysis cycle is begun.

If discrepancies are found in the above-described data comparison, an error routine is initiated. If the error was service-affecting and not merely transient, output trouble numbers are generated by the microprocessor 30. These trouble numbers are formatted to specify the type of error observed and indicate to the TSS maintenance personnal methods of repairing the TSS 11, as will be described below. As they are generated, these trouble numbers are stored in another temporary storage unit 61 in the error output unit 60 as shown in FIG. 10 to await read-out on a two-digit display by the TSS maintenance personnel.

Special provision is also made in the maintenance monitor 20 for its intitialization when a TSS 11 power-on or reset condition or a maintenance monitor 20 system re-start condition has occurred. This is so that the maintenance monitor 20 will always store as accurately as possible the TSS 11 current operating status.

Before going more fully into how these various devices and controllers interact with one another, a brief description of the main elements of the maintenance monitor system is given below, so that subsequent discussion of the present embodiment of this invention will be more fully understood.

A. The Microprocessor

The microprocessor 30 is the main manipulator of data and the controller or supervisor of most aspects of the monitor 20 system. A typical type of microprocessor includes the INTEL 8008 8 bit parallel microprocessor unit, as described in the INTEL 8008 User's Manual, rev. 4, November 1973, with some additional control circuitry as described below.

Referring to FIG. 3, the microprocessor 30 communicates over eight bi-directional lines on the processor bus 90. Time multiplexing of the process bus 90 allows control information, addresses, and data to be transmitted between the processor and external memory on this bus. The microprocessor is controlled internally by an instruction set of 48 instructions, including data manipulation, binary arithmetic, and jump-to-subroutine instructions. Microprocessor control is also obtained via the INTERRUPT and READY lines, discussed below. Other devices may be controlled by the processor with the use of the S0, S1, S2 and SYNC output control lines. In the present embodiment S0, S1, S2 and SYNC are decoded in the State Decoder 212 to create, among other control signals, the HALT, WAIT, T1, T2, P1 ENABLE, P2 ENABLE, P4 ENABLE, WRITE ENABLE (WE), and input multiplexer control output signals.

The INTERRUPT (INTR) signal is used to start or re-start the main program flow of the microprocessor 30 whenever a clear signal has been received from the maintenance monitor 20 SYSTEM CLEAR push button 21 shown in FIG. 2. The READY signal is used only in the direct memory access (DMA) mode. The READY command signal is sent from the data input control unit 43 and synchronizes the microprocessor 30 with the DMA Mode. The READY line is inactive unless a request for direct memory access to the random access memory 34 is initialized by the data input control unit 43. When direct memory access is requested, the READY line will go on, causing the microprocessor 30 to go into a WAIT condition, signified by the WAIT line going on, during the time that the direct memory access is taking place. Means in the data input control unit 43 for generating the READY line and using the WAIT line is discussed below in the data input control 43 operation section.

Concerning the control lines outputted by the microprocessor 30, should the microprocessor 30 ever go into a HALT condition, either during initial power up or as a result of a problem with the computer, the HALT line will go on. Whenever the HALT line goes on, it causes an error lamp 201 to light, indicating that the computer has entered a stopped state. The P1 ENABLE line enables the access of information from the RSS 12 to be written into RAM 34 memory. The P2 ENABLE line enables access of information from COSS 10 to be written into RAM 34 memory. The WRITE ENABLE (WE) line controls whether data is written into or read out of the RAM 34. As shown in FIG. 3, the COUNT ABR signal is logically "OR'ed" with the WRITE ENABLE in OR gate 216 so that during the direct memory access mode the RAM 34 may be written into without processor control.

The various registers in the processor include the input/output register 202, the arithmetic and logic unit 204, which implements the addition, subtraction and logic operations called for by the instruction set, and accumulator, memory and program counter registers 206, which among other functions provides temporary storage for data being operated on and temporary storage for program and subroutine addresses.

The instruction decode and control unit 208 provides the logic for manipulating the processor registers based on the type of instruction read in and decoded by the processor. The timing of the processor is regulated by a clock generator 210 that operates from an external two-phased clock. A detailed understanding of how the above described signals generated by the state decoder are produced, is not necessary to appreciate the present invention. Reference to the INTEL 8008 User's Manual should permit a person of ordinary skill in the art to produce specific control circuitry necessary to provide the described signal operation.

B. RAM Memory

A typical random access memory (RAM) and memory addressing scheme is shown in the system block diagram of FIG. 2. The RAM 34 is organized in five blocks of 16 words each for a total of 80 words of memory. Addresses from the microprocessor 30 are coupled by the processor bus 90 to an address register 36. Control signals T1 and T2 (see FIG. 3) from the microprocessor 30 strobe this address into the register 36 which then couples the address to an address buffer register 38 for RAM 34 word selection and to the RAM chip select register 42 for selection of the proper block of 16 words. The address register 36 is required to retain the address desired, since the processor bus 90 is also used in a later part of the processor cycle as the data bus wherein data is either received by the microprocessor or sent out from it to be stored in the memory.

The RAM 34 may also be addressed by the data input control unit 44 during the direct memory access (DMA) mode, wherein the input data is placed into the first block of 16 words in the RAM 34, independent of microprocessor 30 control. This is accomplished by the address buffer register 38 which acts like a word address sequencer in the DMA mode while locking out the RAM chip select register 42 to insure that only the first word block of RAM 34 memory is addressed.

Data can be written into the RAM 34 memory from either of the input temporary storage devices 46, 48 during the DMA mode (to be described hereinafter in the data input operation section) on the data input bus 94, or from the microprocessor 30 on the processor bus 90 via the memory data multiplexer 50.

The multiplexer 50 controls which data word is coupled through to the RAM memory. It is activated by means of the control line READ ENABLE (see FIG. 7), which indicates to the multiplexer whether the data is coming from one of the input temporary storage devices or from the microprocessor 30.

The RAM 34, if addressed by the microprocessor 30, also has the ability to output data to the microprocessor 30 on the memory bus 92. As mentioned above, the RAM 34 is told whether or not the microprocessor 30 wishes to write data into the RAM or read data from the RAM by means of the WRITE ENABLE (WE) line as illustrated in FIGS. 2 and 3. When information is to be read from the RAM 34 to the computer, only the addresses need be given, the WE line is not strobed. Writing information into the RAM, however, does require that the WE line be strobed. During the read cycle, the data is coupled from the RAM to the processor through an input multiplexer 29 that is used to give the processor a choice of inputting either RAM data or data from status bits, or other information desired by the microprocessor 30 from other devices besides the memory. A typical list of status bits monitored by the microprocessor is given in FIG. 6. The input multiplexer 29 is coupled to the microprocessor 30 by the bi-directional processor bus 90.

As shown in FIG. 9, in a typical organizational structure, the RAM 34 memory locations are separated into two major blocks. The first is a 16 word block containing the current TSS data block being analyzed by the microprocessor 30. The second block contains two words each for every switching trunk 16 (see FIG. 1) being monitored in the TSS. In the present embodiment, 21 such trunks store information that, among other things, indicates whether or not the trunk is currently in error free use (the history bit), what lines have been linked up to the trunk, etc. Also in the second block of RAM 34 memory is stored miscellaneous special status bits.

C. ROM Memory

A typical, non-destructive, read-only memory (ROM) 32 and memory addressing scheme is also shown in the system block diagram of FIG. 2. The ROM 32 is addressed in the same way as the RAM 34 is addressed, except instead of using the RAM chip select register 42, the ROM 32 requires a ROM chip select register 40. The addressing scheme for both the ROM 32 and RAM 34 memories is set up so that every memory location, whether it be in the ROM 32 or the RAM 34, is uniquely addressable by the microprocessor 30.

The ROM 32 contains all the stored programs for the maintenance monitor 20. Details of this control cycle program will be discussed in the System Operation section below. In the present embodiment, the ROM 32 has a capacity of 1,024 words, with a capability for expanding this size. Stored in the ROM 32 locations is the maintenance monitor control cycle program and a fixed data table for use by and control of the microprocessor 30. The advantage of ROM systems is that once data or instructions are stored in the ROM, the information cannot be affected by system power failure or processor reprogramming, whereas information in a RAM is alterable in these ways. Note that ROM's can be initially programmed only by special devices at the factory, and although some ROM's have the capability of being reprogrammed, this also can only be accomplished by special devices at the factory.

The ROM 32, if addressed by the microprocessor 30, outputs data onto the same memory bus 92 as does the RAM 34 for reading by the processor via the input multiplexer 29 and processor bus 90.

D. Data Input Operation and Control

1. General Operation

The data received by the maintenance monitor 20 is received from two different sources. In the present embodiment, as shown in FIG. 1, the data comes from either the central office switching subsystem (COSS) 10 or the remote switching subsystem (RSS) 12 of the TSS 11. The data is composed of 16 words of 8 bits each (128 bits total). Although the maintenance monitor 20 can only analyze one block of 16 words at a time, usually a TSS 11 cycle to be monitored requires the generation of four such blocks of data. To allow for this, the data input circuitry is designed to store in FIFO's a maximum of four blocks of data at any given time from each of the subsystems.

The data is received from the two subsystems in different forms. This is due to the TSS system constraint that only one dedicated trunk line 14 is available to transmit RSS 12 data to the maintenance monitor 20, whereas the COSS 10 has 128 lines available. As shown in FIG. 1, the maintenance monitor 20 is located at the COSS 10 end of the TSS 11. Since only one trunk is available for RSS data, this data is initially formatted into a serial bit string in the Remote Collector and Transmitter 22 located in the RSS 12. This Transmitter 22 then sends the data through the dedicated trunk line 14 to the COSS 10 and from there through bus 18 to the maintenance monitor 20 for monitor analysis. Therefore, the RSS 12 data must be read in serially, one bit at a time, at the maintenance monitor 20 and then constructed into 8-bit words, whereas the COSS 10 data must be broken down from one 128-bit word to 16 words of 8 bits each. A more specific description of the circuitry involved in this process is described below in the System Operation section.

Referring to FIG. 4, we see that the input data is first written into temporary storage FIFO's 46, 48 to await monitor analysis. During this writing process, the microprocessor 30 is precluded from requesting new data for analysis. When the microprocessor 30 is ready to analyze another block of 16 words, it signals the data input control unit 43 to load a block of data into the RAM 34 memory. If Remote FIFO 48 status lines indicate RSS 12 data is stored in the FIFO and ready to be analyzed, the microprocessor 30 requires that this data be analyzed first before COSS 10 data. This is because the RSS 12 transmits data over a dedicated link at a slower data transmission rate than does the COSS 10. Referring to FIG. 5, the data input control unit 43 controls the transfer of the temporarily stored data automatically into the RAM 34, when the microprocessor 30 indicates that it is ready to analyze a new block of data. Since the microprocessor 30 is not involved in the data transfer process, this section is called the direct memory access (DMA) mode. During the data transfer, new data from the TSS is locked out by the data input control unit 43 and cannnot be written into the FIFO's 46, 48. This is to guarantee that the new TSS data is loaded into the FIFO's properly. When the RAM 34 loading is complete, the maintenance monitor 20 control is returned to the microprocessor 30. The specific circuitry involved in this process is also described in more detail below in the System Operation section.

E. Error Output Unit

Referring now to FIGS. 2 and 10, we see that when the microprocessor 30 has detected a service affecting error in the TSS system, it has the ability to couple data out onto processor bus 90 for loading into the error output storage FIFO unit 61, located in the error output temporary storage and display unit 60. The errors are detected and formatted by the microprocessor 30 into trouble numbers that are easily decypherable by TSS maintenance personnel. The trouble number consists of two to eight digits. Only two digits may be displayed at any one time. Since the FIFO, by definition, is a device that shifts data inputted to it out to the FIFO output lines with subsequent data being shifted or "queued" up against the first data, the first trouble number stored in the FIFO 61 automatically appears on the output display 66, 68. Also, once the FIFO 61 has all of its number storage locations filled, no new trouble numbers are accepted by the FIFO. This insures that the original cause of the trouble numbers generated remains in the FIFO 61 for TSS maintenance personnel read-out.

If a trouble number is larger than two digits, or if subsequent trouble numbers are desired to be displayed, a read-out push button 69 is pushed and released to signal the FIFO 61 to display the next two digits. If a displayed number is preceded by a decimal, it is part of the previous trouble number displayed. When one or more decimal numbers have been displayed, the next non-decimal number is the start of a new trouble number. Since the error output unit 60 does not recirculate trouble numbers that are read out, once these numbers have been read, the numbers are erased by the FIFO 61. Finally, the condition of a blank display indicates that no more trouble numbers are stored therein.

To decypher the trouble numbers received, the maintenance personnel need only refer to a trouble number dictionary, which leads them through a repair sequence suggested for the condtion representing the detected number. More than one trouble number may be required to completely reference a repair operation.

F. System Operation

1. System Start Up

To start maintenance monitor system operation, the system must first be initialized. This is done by pressing the system clear push-button 21. As shown in FIG. 2, the system clear pulse (CLR) generated by this button is coupled to the reset lines of the data input control and temporary storage unit 43, the error output unit 60, the memory address register 36, and the microprocessor 30. In the microprocessor 30, referring to FIG. 3, the system clear pulse sets the flip-flop 213 which enables the interrupt (INTR) flip-flop 211 to change state at the correct clock time as controlled by the AND gate 214. This flip-flop output, in turn, is coupled to the microprocessor 30 as an INTERRUPT signal. Although the microprocessor 30 automatically clears all of its internal registers upon sensing that power has been turned on, when a restart has been generated, the interrupt signal also causes the internal registers to be cleared, and further allows subsequent initialization steps depending on the sophistication of the system using the microprocessor. In the present embodiment, the INTERRUPT signal causes the microprocessor 30 to address location 0001 of the ROM 32 which, in turn, points the computer to the starting address of the control cycle program, to be described below, stored in ROM 32 memory. Once the microprocessor 30 enters the INTERRUPT state, the state is decoded in the state decoder 212 which sends out the INTER State Detect signal to reset the flip-flop 213, even though the clear push button may still be depressed, and thus resets the flip-flop 211 to allow the microprocessor 30 to start processing.

To indicate to TSS maintenance personnel that a successful maintenance monitor initialization has occurred, an 01 appears on the trouble number display 66, 68 as shown in FIG. 10. The READ-OUT push button 69 should then be pushed to clear the 01 from the display, so that the display again goes blank, and thus clear the trouble number FIFO storage unit 61 for the first valid trouble number. The maintenance monitor 20 will not allow trouble numbers to be outputted until it knows that its status registers have been brought up-to-date with what presently is the actual state of the TSS 11.

2. The Control Cycle

The control cycle of the maintenance monitor 20 is illustrated in flow diagram form in FIG. 8. There are many different types of electronic control devices available for implementing the control functions that are sequenced in the control cycle. In the present embodiment, a ROM 32 has been chosen to generate these control functions. It is programmed to give a predetermined output, either a logic 1 or a logic 0, on eight separate lines depending on the address applied to the ROM 32 on its input lines. These output line states are what instruct and supervise the microprocessor 30 in its manipulation of the maintenance monitor system. The control cycle is the system controller of the maintenance monitor.

The first function that is performed by the control cycle after it is accessed by the interrupt signal is the clear and start routine. This routine decides whether or not the RAM 34 should be cleared of its contents and if so, to initiate this process. This is required because the clear and start routine is accessed by three conditions: system power on; monitor system restart; and TSS memory reset. Referring to FIG. 8, the first test that is performed is to determine if the clear and start routine has been initiated due to a system power-up. The microprocessor 30 can determine this by reading samples of the RAM 34 memory to see if the proper codes are present. It does this by comparing the RAM 34 words with words stored permanently in the data reference table located in the ROM 32. If a mismatch is discovered, the microprocessor 30 knows that a system power-up has occurred and proceeds to clear the entire RAM 34 memory.

If no mismatch is found, the microprocessor then checks to see of the clear and start routine was initiated as a result of a monitor system restart or if it had been branched to by a TSS memory reset detect, to be discussed below. If it were due to a monitor system restart, this indicates that the RAM 34 may have some current correct TSS 11 status information stored therein. The microprocessor 30 would then only clear those entries in the status table that do not have "history bits" set. The history bit indicates that current data is in that particular memory word location. This is because even though a TSS trunk connection is found to be invalid (as exemplified in the Data Operation Example section below) and output trouble numbers generated, the data describing the erroneous connection is still stored for future reference in the RAM 34 status table. The history bits are used to distinguish this data from correct data entered into the status table. Not setting the history bit also keeps the microprocessor 30 from outputting later trouble numbers erroneously. Therefore, a system restart saves only those status table entries that are error-free and validly indicate the present status of the TSS 11.

Once the above two tests have been performed and any indicated tasks carries out, the clear and start routine finishes by performing miscellaneous other minor initializing operations to prepare the maintenance monitor 20 to analyze data.

The next routine that the control cycle performs is the operating system routine. As indicated again in FIG. 8, the first function that is performed in this routine is to check whether the TSS 11 clear memory switch has been pressed. TSS maintenance personnel can clear TSS connection paths or TSS memory. If connection paths are cleared, any calls in progress are disconnected. If the TSS memory only is cleared, calls in progress remain connected, but TSS memory no longer knows this. Therefore, since the maintenance monitor 20 exists to keep track of the operation of TSS, if these clear conditions have been detected, the monitor will also completely clear its RAM 34 memory and reenter the control cycle at the Clear and Start Routine.

If the TSS Clear Memory switch was not pressed, the status lines of the data input FIFO's 46, 48 are then checked. As discussed before, the status lines disclose whether there are any data blocks presently stored and waiting to be analyzed, or whether either FIFO is full or empty. The subroutine that reads in these status bits is called the F/STAT routine. Initially, it checks to see if any priority errors have been detected from the RSS 12 data that has been received serially over the dedicated link 14 described supra. If an error is detected, a trouble number is generated. It should be noted that since the invention only monitors the functioning of a TSS, the monitor does not end its analysis cycle if errors are detected; it continues to analyze the data since the TSS continues to operate. The F/STAT subroutine then tests to see if in fact a block of data from the TSS is ready to be analyzed by the maintenance monitor 20. If not, the control cycle allows the microprocessor 30 to wait and keep checking the input FIFO's 46, 48 status until a data block does get detected by the monitor. When a block of data has been detected, the control cycle moves out of the F/STAT subroutine and tests the status bits to determine if the data has originated in the RSS 12. As mentioned before, data from the remote switching system has priority over COSS 10 data because it moves over a slower data path.

At this point the control cycle branches into two separate sections, one tailored to analyze RSS 12 data and the other tailored for COSS 10 data. Looking first at the RSS data analysis path, if remote data is ready to be analyzed, the microprocessor 30 sends a P1 EN-ABLE signal to the data input control unit 43. This initiates a DMA transfer of data from the Remote FIFO 48 to the RAM 34. After completion of the data transfer, monitor control is returned to the microprocessor 30 which immediately begins to analyze the data.

The analysis begins with the decoding of the data to determine what function is being monitored. In the present embodiment, the TSS 11 generates four types of functions for analysis. They are Remote Terminal Remote Call Connect (RTRCC), the Remote Terminal Local Call Connect (RTLCC), the Remote Terminal Local Call Disconnect (RTLCD), and the Remote Terminal Remote Call Disconnect (RTRCD). Optional additional functions also may be added. The microprocessor 30 checks to make sure that only one function is being performed. If more than one is initiated or if none are indicated, a trouble number is generated.

For each function there are usually four blocks of data taken, one after a 17 millisecond interval, another after 166 milliseconds, etc., so that the operational sequencing of a particular function may be observed. These sequence indicators are called triggers. The microprocessor 30 also checks these indicators to make sure only one is occurring at a given time. The triggers are numbered 1 through 4 so that, if an out-of-sequence trigger is detected, trouble numbers are again generated.

The maintenance monitor 20 is set up to take blocks of data on a particular function for as long as that function is operating in the TSS. As mentioned above, usually four triggers are taken for each function. If a fifth trigger is detected for a function, it is labeled a trigger number 1 and the microprocessor 30 keeps track of the fact that it is viewing the second trigger 1 received for that function. This flexibility is built in because the monitor may at some point want to look at a functions operation way out in time.

At this point in the data analysis, the microprocessor 30 branches to specific sequences in the control cycle based on the type of function detected. Since FIG. 8 adequately shows these branch routines, a detailed discussion of the branches will not be attempted here, but reference is suggested to the Detailed Operation section below wherein one of these branches is followed step by step. At the end of each branch, the status word in monitor memory, corresponding to the specific trunk being monitored, is updated with the new data received in analysis.

If no errors have been detected in the analyzed data, the history bit is set in the status word to indicate that a valid switch path has been set up in the switching system, or the bit is reset if a valid disconnection of a switching patch has occurred. If errors have been discovered in some miscellaneous data that does not indicate customer-affecting problems, these errors do not affect the setting of the history bit and are not outputted as trouble numbers, but are stored for one cycle in case a data alarm occurs, as described below.

This completes a control cycle for an RSS 12 block of data. At this point, the microprocessor 30 automatically returns to the Operating System routine to analyze the next block of data.

The control cycle sequence for COSS 10 data is quite similar to the RSS 12 data discussed above with two notable exceptions. When the microprocessor 30 has determined that the data block has been generated in the Coss 10, the microprocessor 30 directs the data input and control unit 43 to load this new COSS 10 data into RAM 34 in the same way as the RSS data described above is loaded. The microprocessor 30, to distinguish that COSS 10 data instead of RSS 12 data is desired to be read in, sends a P2 ENABLE pulse to the data input and control unit 43. Once read in, the data is initially checked for the correct form of function and trigger count, as above described for Remote data.

A second error condition is tested for at this point that is not performed on Remote data. The test is to determine if a Data Alarm has occurred. The Data Alarm is one of the primary error functions detectable at the COSS 10. It indicates whether a data link failure has occurred. As much prior data as possible is then needed to diagnose the cause of the error. Therefore, the last known TSS trunk selected and its status is outputted in trouble number format and if any miscellaneous data errors are stored from the last cycle, this information is also outputted.

If No Data Alarm is detected, the control cycle branches to various sequences depending on which function is being analyzed. As can be seen from FIG. 8, the scheme is quite similar to that used in analyzing data from the RSS 12. In the present embodiment, the functions of the COSS 10 that are monitored include the Central Office Remote Call Connect (CORCC), the Central Office Local Call Connect (COLCC), the Central Office Remote Call Disconnect (CORCD) and the Central Office Local Call Disconnect (COLCD). At the end of the data comparison analysis of COSS 10 data, the control cycle again returns to the Operating System routine, to repeat the process with the next block of data.

3. Detailed Operation Example

It is necessary to describe the maintenance monitor 20 and its operation with respect to a typical block of data in order to more fully understand and appreciate this invention. The example used herein is of a block of data depicting the second trigger of an RT RCC function received from the RSS 12.

As shown in FIG. 1, the RSS 12 data is first formatted into a serial bit string in the remote data collector and transmitter 22 located in the RSS 12. It is transmitted over a dedicated trunk to the COSS 10, and from there to the maintenance block 20. From FIG. 4, it is apparent that the data block is received in the maintenance monitor 20 by a serial-to-parallel converter 54. The converter is designed so that it detects when the first data word "word 1" has been received. "Word 1" is a specifically formatted word wherein the first six bits of a 128 bit string are set in predetermined states. Logic in the converter 54 detects these states to indicate that the writing process can now be performed. The "word 1" signal enables the AND gate 100. AND gate 100, when actuated, turns on the Remote Scan flip-flop 102 to start the FIFO 48 write process. To operate, AND gate 100 also requires that the Remote FIFO 48 not be full. This state is indicated by a FIFO status line as shown in FIG. 4. Finally, a READY line must be in the state (high) that indicates that the data input control unit 43 is not presently in the process for reading input data from an input FIFO 46, 48 into RAM 34 memory.

After AND gate 100 is actuated at the proper clock time, and the Remote Scan flip-flop 102 is set thereby, the output of flip-flop 102 enables AND gate 104. This gate also has as an input the Data Ready (DR) signal from the converter 54, which indicates that the first word is ready for writing into the FIFO 48. The output of AND gate 104 is the WRITE ENABLE signal. It is gated through two more AND gates 106 and 108, which protect the FIFO 48 from getting a WRITE ENABLE signal if either FIFO 46 or FIFO 48 is currently being read out, and at the proper clock time, the WRITE ENABLE signal is coupled to the FIFO 48 to write the first word of the incoming data block into the FIFO 48.

The output of AND gate 106 also strobes the Strobe flip-flop 110. Its output enables AND gate 112 to detect a second clock pulse, and as a result, generate a Data Ready Reset (DRR) pulse to reset the converter 54. This enables the converter to begin conversion of the next data word. This same clock pulse resets the Strobe flip-flop 110. Prior to this, however, the Strobe flip-flop 110 output also strobes a 16-count counter 114, whose purpose is to track the number of words that are being written into the remote FIFO 48. This process is repeated until all 16 words of a given block of data have been received and written into the FIFO 48. Thus, the Strobe flip-flop strobes the counter 16 times, indicating that all 16 words of the data block have been written into the FIFO 48 memory. At this point, the counter 114 outputs the "16th count out" signal to reset the Scan flip-flop 102, and thereby complete the FIFO 48 writing process for one block of data.

Although the present example is describing the manipulation of data originating in the RSS 12, as can be seen from FIG. 4, the process for writing COSS 10 data into the Central Office FIFO 46 is conceptually quite similar.

The RT second trigger typical block of data now waits to be analyzed by the microprocessor 30. The microprocessor 30 determines that this is the data block it wishes to analyze next by reading the status bits of the FIFOs 46 and 48. These bits tell it that a data block is in the remote FIFO 48 and that the remote FIFO 48 is not currently in the process of having data written into it. If the data block is ready for analysis, the microprocessor 30 causes the P1 ENABLE line to turn on. As shown in FIG. 6, this signal is coupled over the data input control bus 95 to the data input control unit 43. As illustrated in FIG. 5, the P1 ENABLE signal sets the P1 ENABLE flip-flop 150. The output of this flip-flop enables the Remote Read flip-flop 148 and also is connected to an OR gate 154, whose function is to output a signal if either the P1 ENABLE flip-flop 150 or the P2 ENABLE flip-flop 152 have been set. The output of OR gate 154 is fed to the AND gate 152 to enable a subsequent operation described below. The OR gate 154 output also sets the READY flip-flop 156. This flip-flop adds a further enable to the Remote Read Flip-flop, also sends the READY signal to disable operation of FIFOs 46, 48 write control logic as shown in FIG. 4, and also sends the READY signal to the microprocessor 30 over the bus 95 as an indication that the ENABLE signal has been received and processed by the data input control unit 43. The microprocessor 30, upon receiving this indication, causes the WAIT signal to be coupled back to the data input control unit 43 over the bus 95 to indicate that the microprocessor 30 has paused to allow the direct memory access (DMA) mode to take place. As illustrated in FIG. 5, the WAIT signal is coupled to the READ flip-flop 158 via OR gate 153. The WAIT line acts normally to lock off the READ flip-flops 158, 160. Therefore, when the microprocessor 30 activates the WAIT line for DMA data transfers, the READ flip-flops 158, 160 are unlocked, thus allowing the next clock pulse to change the state of whichever of the flip-flops has been enabled. Since in this case, the Remote Read flip-flop 158 has been enabled by the P1 ENABLE flip-flop 150 and the READY flip-flop 156, the READ flip-flop 158 changes state, thus initiating the DMA data transfer.

The READ flip-flop 158 accomplishes the DMA mode transfer by being connected: (1) through an OR gate 166 (an OR gate to allow either a signal from the Remote Read flip-flop 158 or the Central Office flip-flop 160 to pass through) to create the READ ENABLE signal, (2) through AND gates 162 and 164 to initiate FIFO 48 to read out; and (3) through AND gate 180 to enable any remote transmission parity errors to be detected.

The READ ENABLE signal is coupled through bus 95 to the memory data multiplexer 50 where it controls the data path to RAM 34 memory. During DMA, the other data input path to the multiplexer 50, from the microprocessor 30 on processor bus 90, is locked out by the READ ENABLE, whereas data from the input FIFOs 46, 48 is allowed. The READ ENABLE signal is also coupled to the address buffer register (ABR) 38 and to the three address inputs of the RAM chip select register 42 wherein during DMA and READ ENABLE signal locks out any chip addressing to guarantee that the data block is read only into the first 16 word block or RAM 34 memory. The READ ENABLE is lastly coupled to AND gates 172 and 174 to enable the functioning of these gates. AND gate 172 immediately outputs a signal when enabled, since, as described above, the other AND gate input signal is being generated by the OR gate 154. The output of gate 172 is the CLR ABR signal that is coupled through the DMA mode control bus 93 (see FIG. 6) to reset the address buffer register 38. This reset signal goes away at the next clock time since the P1 ENABLE flip-flop 150 that provides the input to the OR gate 154 is reset, as described above, as soon as gate 162 is enabled. This sequence insures that the address buffer register 38 loads the first data word into the first memory location of the RAM 34.

After the first word has been written into RAM 34 memory, AND gate 174 is actuated by a later clock to increment the address buffer register 38 one count. This is the CNT ABR signal, as shown in FIGS. 5 and 6. The CNT ABR signal also is coupled through bus 95 and an OR gate 214 in the microprocessor 30 (see FIG. 3) to generate the needed WRITE ENABLE (WE) pulse for RAM 34 READ/WRITE control. The CNT ABR signal also enables the parity error AND gate 180.

The second READ flip-flop 158 connection path is through gates 162 and 164 to strobe the FIFO 48 to read out its stored date block. The flip-flop 158 enabling of AND gate 162 allows clock pulses to be fed therethrough. With the first clock pulse, the P1 ENABLE flip-flop 150 is reset to reinitialize that flip-flop for the next read cycle. AND gate 164 merely functions to protect the system from having both FIFOs 46 and 48 outputting data at the same time.

Finally, the READ flip-flop 158 output is also connected to AND gate 180, as mentioned above, to enable parity checking. AND gate 180 monitors the bit 9 output of the FIFO 48. If a parity error has been detected with any word while it was being written into the FIFO 48 from the RSS 12, the bit 9 was set as described previously. When this word is read out of the FIFO 48, bit 9 is still set. Therefore, if it is set and if gate 180 is enabled by the Remote Read flip-flop 158, the parity error flip-flop 182 is set during the CNT ABR pulse time. The output of this flip-flop 182 is coupled to the microprocessor 30 over bus 95. If a parity error is detected on any word in the 16 word data block, the microprocessor 30 will reject the entire 16 word block. This data is not lost, however, because the COSS 10 data essentially corresponds in content with remote data for each trigger received. The parity error flip-flop is then reset by the next CLR ABR signal. Note that if four consecutive parity errors are received, the microprocessor 30 will output a trouble number to indicate this fact.

IN the DMA mode, therefore, clocking pulses are fed to the FIFO 48 to clock out one word at a time and are also fed to the address buffer register 48 to increment this register one address at a time. When the 16th count is reached by this register, it signals "16th count" through the bus 93 back to the data input control unit 43 to reset the READY flip-flop 156 and thereby reset the READ flip-flop 158 at the next clock time. Thus concludes the DMA mode transfer of the data block to RAM 34 memory.

Again, although the present example is describing the manipulation of data from the Remote FIFO to RAM 34 memory, as shown in FIG. 5, the process for reading data from the Central Office FIFO 46 into the RAM 34 memory is almost identical.

It should be noted at this point that the FIFO's used in the data input and control unit 43 and in the error output unit 60, are unique in that they do not require a complex addressing scheme to operate. Only a READ and a WRITE line is required for full operation since, as described in the Error Output Unit section of this specification, each FIFO automatically queue's words that have been written into the FIFO up against previously inputted words at the output port of the FIFO, to await read-out.

The RT RCC second trigger typical block of data is now stored in the first 16 words of the RAM 34 and is ready for analysis. Referring now to the control cycle (system controller) as shown in FIG. 8, since the data has been loaded into the RAM 34, one can see that the first sequences of the Operating System Routine have been completed and the microprocessor 30 is ready for the initial testing of the data for correct function status and trigger status. Assume for illustrative purposes that only one function, the RT RCC, is in fact being shown by the data as being performed. Assume further that one trigger has already occurred and that therefore the occurance of a second trigger and its accompanying data is proper. Therefore, no trouble numbers would have been generated thus far.

At this point, the control cycle branches to an analysis of the particular function detected, in this case the RT RCC. The first test performed is to determine if the trunk identity has been set. The trunk identity should be zero only for the first block of data, corresponding to trigger 1, since under normal operation the TSS 11 does not determine for itself the trunk number of the trunk to be used as the data path until the time corresponding to a second trigger data monitoring. Therefore, in the example chosen, assume that the trunk number is correctly not zero, and so that sequence continues into the Trunk Scan Subroutine.

The Trunk Scan Subroutine is the main checking routine of TSS data. In scans all the bits in the RAM 34 trunk status table to determine if there are error conditions of multiple lines being assigned, multiple trunks being assigned the same line, the history bit being set, etc. In general, the routine scans the trunk status table to make sure the RSS 12 switching connection is a valid one that does not conflict with other switched paths. If the scan finds that there are no error conditions, the control cycle continues, whereas if error conditions are discovered, these are outputted as trouble numbers and then the control cycle continues.

Assume for example, that the history bit has already been set for the trunk being assigned for the present RT RCC function, thus creating an error condition. This is because a set history bit normally indicates that a valid connection already exists on that particular trunk. The history bit is either reset by the detection of a valid disconnection of the switching path to the particular trunk or by the monitor during power startup or when the TSS clear memory has been detected. Therefore, if the RSS 12 assigns a second line to a trunk that already has a line assigned to it, indicated by the history bit set, a trouble number is outputted. As discussed in the Data Output section above, the microprocessor 30 formats the trouble number and loads it, 2 digits at a time, into the output FIFO 61 as shown in FIG. 10 for subsequent display to maintenance personnel. The Trunk Scan routine lastly enters the new function data into the corresponding trunk status word in monitor memory.

Even though an error condition has been found, the maintenance monitor 20 continues to sequence through the control cycle, since the RSS 12 does not stop operating but would try to make the erroneous connection. The maintenance monitor 20 is designed to continue to follow the TSS 11, outputting error conditions as they are detected.

The control cycle then enters the Line, Compare and Connect (LCPCON) subroutine, again as shown in FIG. 8, to compare the line number selected by the RSS 12 with what the microprocessor 30 calculates that the RSS 12 should have selected. If they do not match, again trouble numbers are generated. Assuming they do match, the control cycle then checks if trouble numbers have been generated during the Trunk Scan Subroutine. If not, the microprocessor 30 sets the history bit to indicate that a valid trunk connection has been performed. In the RT RCC example, since there were trouble numbers generated, the history bit is not set.

Finally, the various miscellaneous, i.e., non-customer-affecting, status bits of the second trigger RT RCC function are scanned by comparing these bits with what is stored in the ROM 32 data reference table. If a mismatch is discovered, trouble numbers are generated if previously customer-affecting trouble numbers are generated. If a mismatch is discovered, but no previous customer-affecting errors were detected, any mismatches are stored for readout in case a data alarm is generated during the next control cycle.

The control cycle analysis of a data block ends with this miscellaneous checking routine, and the control cycle is begun again at the entry point for analysis of the next block of data.

The present embodiment of this invention is to be considered in all respects as illustrative and not restrictive; the scope of the invention being indicated by the appended claims rather than by the foregoing description and all changes which come within the meaning and range of equivalency of the claims therefore are intended to be embraced therein.

I claim:

1. A data processing system for the monitoring and maintenance of an electronic switching system wherein the said processing system obtains data from said switching system indicating the present operating status of the switching system and the processing system detects and diagnoses operation errors based on the form of this said data and communicates these results to maintenance personnel, said processing system comprising:
   a. processor means for analyzing and testing the switching system data to thereby detect and diagnose operation errors occuring in the said switching system;
   b. system controller means for controlling the nature and sequence of the analysis done by said processor means;
   c. memory means for the storage of data while it is manipulated by said processor means and system controller means and for the storage of ongoing switching system operation status;
   d. data input means including
      i. input data storage means and data input control means for the inputting and temporary storage of data supplied by said switching system independent of processor control, and
      ii. means for coupling the input data from the input data storage means to the memory means when the processor means is ready to accept new data from analysis and testing; and
   e. output means including
      i. means for receiving said detected operation errors from the processor means and
      ii. means for storing and outputting said detected operation errors.

2. The data processing system of claim 1 wherein the means for storing and outputting the said detected operation errors comprises means that operate independently of the processor means, memory means, or system controller means.

3. The data process system of claim 2 wherein the means for storing and outputting the detected operation errors further comprises:
   a. output storage means for the retention of any detected errors until the retained errors are read out by maintenance personnel;
   b. means arranged so that once the said output storage means are full to capacity with detected errors, no other errors are stored, so that the origin of a recurring switching system malfunction may be more easily discovered and repaired by maintenance personnel; and
   c. display means for communicating to maintenance personnel the errors stored in the output storage means and operable by maintenance personnel independent of the processor means and system controller means, thereby allowing read-out of errors even though the processor means continues to analyze other data.

4. The data processing system of claim 3 wherein the output storage means further comprises of storage unit that does not require complex addressing but operates by shifting each error as it it stored in the said unit through to the output queue of the unit, so that if the said unit is initially empty, the first error stored automatically appears in the output port, for display, the next word stored is queued up against this word and so on, thereby requiring only a read and a write control line to operate the said unit.

5. The data processing system of claim 1 wherein the data input means further comprises input data converter means for insuring that received data is in the proper data block format for data analysis, wherein a data block comprises a plurality of words of one or more informational bits each.

6. The data processing system of claim 5 wherein the input data storage means comprises means for temporarily storing, to await data analysis, data in the form of a plurality of data blocks reflecting switching system operation, and comprises means for indicating that the said data input storage means are full and cannot accept any new data blocks.

7. The data processing system of claim 6 wherein the data input control means comprises:
  a. means for controlling the input data converter means such that the correct number of data words comprising the data block are inputted to the data input storage means;
  b. means for disallowing new data to be read into the data input storage means, if the data input storage means are full;
  c. means for disallowing new data to be read into the data input storage means while data is being read out of the same said storage means; and
  d. means for coupling, after receiving a request for a new block of data by the processor means for analysis, the next data block from the data input storage means to the said memory means independently of the processor means and system control means, wherein the number of words in a data block is kept track of by counter means in the data input control means to insure that only the plurality of words in one block is coupled through, no more and no less, and wherein the center means further comprises means for addressing the proper area of the said memory means to insure that the data block is properly coupled to the memory means.

8. The data processing system of claim 7 wherein the switching system data blocks, if received from two separate subsystems of the switching system, can be inputted into separate data input storage means and controlled by separate data input control means, for later comparison of the data after analysis by the processor means and for protection against the possible loss of data, if this data is essentially the same from either source, for any given switching system operation that is monitored.

9. The data processing system of claim 8 wherein the input data storage means further comprises a storage unit which does not require complex addressing but operates by shifting each data word as it is stored in the said unit through to the output queue of the said unit, so that if the said unit is initially empty the first word stored automatically appears at the output port, the next word stored is queued up behind this word, and so on, thereby requiring only a read and a write control line to operate the said unit.

10. The data processing system of claim 1 wherein the memory means comprises a random access memory.

11. The data processing system of claim 1 wherein the processor means comprises microprocessor means and state decoder means.

12. The data processing system of claim 11 wherein the microprocessor means comprises a miniaturized electronic assembly including an input/output register, an arithmetic logic unit, an accumulator register, a plurality of temporary storage registers, a program counter, a clock generator, an instruction and decode and control unit, and means for coupling signals from one register or unit to another, for the implementation of various instructions as decoded by the instruction decode and control unit, and comprising a plurality of data lines connected to the input/output register to couple the microprocessor means to external systems and a plurality of microprocessor control lines to further couple the microprocessor means operationally to external systems.

13. The data processing system of claim 12 wherein the state decoder means comprises means for taking the said microprocessor control lines and generating a plurality of system control lines for use in processing system operation.

14. The data processing system of claim 13 wherein the system controller means comprises a control cycle including a list of control instructions for the manipulation of the microprocessor means and for control over the state of the said system control lines outputted by the microprocessor means.

15. The data processing system of claim 14 wherein the control cycle is embodied in non-erasable read only memory means comprising a plurality of memory locations containing the said list of control instructions for processing system manipulation.

16. The data processing system of claim 15 wherein the read only memory means further comprises a list of constants that contain information as to the proper operation of the switching system for the facilitation of switching system data analysis and error detection by the system controller means and microprocessor means.

17. A data processing system for the monitoring and maintenance of an electronic switching system including data input means, processor means, system controller means, memory means and error output means, wherein the said processing system formats data from the said switching system into data blocks having a plurality of words of one or more informational bits each, and then stores the data to await data analysis, said data input means comprising:
  a. input data proper means for insuring that received data is in the priper data block format for data analysis;
  b. input data storage means comprising means for temporarily storing data in the form of a plurality of data blocks reflecting switching system operation to await data analysis, and comprising means for indicating that the said data input storage means are full and cannot accept new data blocks; and
  c. data input control means comprising:
    1. means for controlling the input data converter means such that the correct number of data words comprising the data block are inputted to the data input storage means;
    2. means for disallowing new data to be read in if the data input storage means are full;
    3. means for disallowing new data to be read into the data input storage means while data is being read out of the same storage means; and
    4. means after receiving a request for a new block of data by the processor means for analysis, for coupling the next data block from the data input storage means to the said memory means independent of the microprocessor means and system control means, wherein the number of words in the data block is kept track of by counter means in the data input control means to insure that only the plurality of words in one data block is coupled through, no more and no less.

18. The data processing system of claim 17 wherein the counter means further comprises means for addressing the proper area of the said memory means to insure that the data block is properly coupled to the memory means.

19. The data processing system of claim 18 wherein the input data storage means further comprises a storage unit which does not require complex addressing but operates by shifting each data word as it is stored in the said unit through to the output queue of the said unit, so that if the said unit is initially empty the first word stored automatically appears at the output port, the next word stored is queued up behind this word, and so on, thereby requiring only a read and a write control line to operate the said unit.

20. A data processing system for the monitoring and maintenance of an electronic switching system including a processor unit under the control of system controller means that analyzes data received from the said switching system and outputs detected errors in the operation of said switching system via output means, said output means comprising:
 a. output storage means for the retention of any detected errors until these errors are read out by maintenance personnel;
 b. means whereby once the said output storage means are full to capacity with detected errors, no other errors are stored, so that the origin of a recurring switching system malfunction may be more easily discovered and repaired by maintenance personnel; and
 c. display means for the communication to maintenance personnel of the said errors stored in the output storage means, operable by maintenance personnel independent of the processor unit and system controller means thereby allowing read out of errors even though the processor unit continues to analyze other data.

21. The data processing system of 20 wherein the output storage means further comprises a storage unit that does not require complex addressing but operates by shifting each error as it is stored in the said unit through to the output queue of the unit, so that if the said unit is initially empty, the first error stored automatically appears in the output port, for display, the next word stored is queued up against this word and so on, thereby requiring only a read and a write control line to operate the said unit.

22. A data processing system for the monitoring and maintenance of an electronic telephone switching system wherein said processing system obtains data from said switching system, said processing system existing and operating apart from said switching system, and wherein the processing system detects and diagnoses operation errors based on the form of said data and communicates these results to maintenance personnel, said processing system comprising:
 a. microprocessor means comprising a microprocessor and state decoder means for analyzing and testing the telephone switching system data to thereby detect and diagnose operation errors occuring in the said switching system;
 b. system controller means for controlling the nature and sequence of the analysis done by said microprocessor means;
 c. memory means for storage of telephone switching system status and temporary storage of current switching system data being analyzed;
 d. data input means for inputting and temporarily storing data supplied by said switching system, including means for coupling said input data to the memory means when said data is requested by said microprocessor means; and
 e. error output means for the communication of detected telephone switching system operation errors to maintenance personnel.

23. In a data processing system including input storage means, memory means, controller means, and error indicator means, a method of detecting errors in an external electronic switching system comprising the steps of:
 a. detecting electronically the operating state of said switching system for determining thereby whether said switching system has attempted a new operating signal path;
 b. if an operating signal path has been attempted, storing data representing the specific path attempted in a queue in said input storage means behind other previously-stored path attempt data;
 c. transferring said specific path attempted data to said memory means when the controller means is ready to test the next path for errors and said path data is at the front of the queue;
 d. electronically testing said specific path attempted data with information representing the former status of that path, said path status also stored in said memory means, to determine whether or not the path attempted is in fact created and whether the path is the proper path chosen;
 e. if an error is found by said tests, actuating said error indicating means, so that said error is displayed thereby;
 f. if no error is found in the new path, updating said path status in said memory means to reflect this new path; and
 g. repeating of steps (a) through (f).

24. A method as in claim 23 further including the steps of:
 a. determining if a switching system power-up has occured, and if so, resetting all switching system path status memory locations in said memory means;
 b. detecting if a processing system restart has occurred or if a system clear switch has been actuated, and if so, resetting said path status memory locations in said processing system that do not contain valid data as determined by the state of a history bit in each said status location; and
 c. performing other special tests, as required, to initialize the processing system.

25. The method of claim 23 wherein step (e) further includes the steps of:
 a. storing in an output queue means each of said errors prior to actuating said indicating means; and
 b. waiting for manual actuation of switch means prior to outputting said errors from said queue means to said indicating means, said manual actuation enabling said indicating means thereby to display errors in the sequence in which they were detected by said processing system.

26. A method as in claim 23 further including the steps of:
  a. electronically detecting the operating state of said switching system to determine whether an operating signal path has been ended;
  b. electronically determining whether the path attempted or ended by said switching system originated at the remote end or the central office end of the switching system; and
  c. electronically performing error tests on the data generated by steps (a) and (b) and outputting errors, if found, in the same manner as for errors found in said attempted path data.

* * * * *

UNITED STATES PATENT AND TRADEMARK OFFICE
CERTIFICATE OF CORRECTION

PATENT NO. : 3,980,839
DATED : September 14, 1976
INVENTOR(S) : ALAN G. HUTCHESON It is certified that error appears in the above-identified patent and that said Letters Patent are hereby corrected as shown below:

Column 5, line 21 "addresses" should read --address--.

Column 8, line 64 "of" should read --if--.

Column 9, line 19 "carries" should read --carried--.

Column 10, line 68 "Coss" should read --COSS--.

Column 13, line 24 "and" should read --the--.

Column 14, line 13 "IN" should read --In--.

Column 14, line 66, "In" should read --It--.

Column 15, line 18, after "clear memory" and before "has been", insert --signal--.

Column 18, claim 17, line 44 "proper" should read --converter--

Column 18, claim 17, line 45 "priper" should read --proper--.

Signed and Sealed this

First Day of February 1977

[SEAL]

Attest:

RUTH C. MASON
*Attesting Officer*

C. MARSHALL DANN
*Commissioner of Patents and Trademarks*

UNITED STATES PATENT AND TRADEMARK OFFICE
CERTIFICATE OF CORRECTION

PATENT NO. : 3,980,839
DATED : September 14, 1976
INVENTOR(S) : ALAN G. HUTCHESON It is certified that error appears in the above-identified patent and that said Letters Patent are hereby corrected as shown below:

Col. 10, line 53 "patch" should read --path--.

Col. 16, claim 3, line 40 "process" should read --processing--.

Signed and Sealed this

Seventeenth Day of May 1977

[SEAL]

Attest:

RUTH C. MASON
Attesting Officer

C. MARSHALL DANN
Commissioner of Patents and Trademarks